(12) United States Patent
Chun et al.

(10) Patent No.: US 9,999,099 B2
(45) Date of Patent: Jun. 12, 2018

(54) HEATING ELEMENT AND A MANUFACTURING METHOD THEREOF

(75) Inventors: Sang-Ki Chun, Daejeon (KR); In-Seok Hwang, Daejeon (KR); Dong-Wook Lee, Daejeon (KR); Jung-Won Park, Seoul (KR); Hyeon Choi, Daejeon (KR); Hyun-Sik Kim, Daejeon (KR); Hui-Jung Park, Gyeonggi-do (KR); Su-Jin Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 778 days.

(21) Appl. No.: 13/145,075

(22) PCT Filed: Jan. 21, 2010

(86) PCT No.: PCT/KR2010/000390
§ 371 (c)(1),
(2), (4) Date: Jul. 18, 2011

(87) PCT Pub. No.: WO2010/085097
PCT Pub. Date: Jul. 29, 2010

(65) Prior Publication Data
US 2011/0272394 A1    Nov. 10, 2011

(30) Foreign Application Priority Data
Jan. 21, 2009   (KR) .................. 10-2009-0005222

(51) Int. Cl.
*H05B 3/02*   (2006.01)
*H05B 3/10*   (2006.01)
(Continued)

(52) U.S. Cl.
CPC .............. *H05B 3/02* (2013.01); *H05B 3/10* (2013.01); *G02B 17/00* (2013.01); *G02B 27/00* (2013.01)

(58) Field of Classification Search
CPC ... H05B 3/16; H05B 3/02; H05B 3/10; G02B 5/0278; G02B 5/045; G02B 5/3033;
(Continued)

(56) References Cited

U.S. PATENT DOCUMENTS 5,798,499 A    8/1998   Shibata et al.
5,874,124 A *  2/1999   Adebayo et al. ............... 427/64
(Continued)

FOREIGN PATENT DOCUMENTS

DE    3323670    1/1985
DE    3708577    9/1988
(Continued)

OTHER PUBLICATIONS

Search Report of European Patent Office in Appl'n No. 10733650.5, dated May 22, 2012.
(Continued)

*Primary Examiner* — Michael G Hoang
(74) *Attorney, Agent, or Firm* — Dentons US LLP

(57) ABSTRACT

The present invention provides a heat emitting body including a) a transparent substrate, and b) a conductive heat emitting pattern having a boundary line shape of figures forming a Voronoi diagram and an intersection point part of boundary lines, at which two or more boundary lines meet each other, forming a curve on at least one side of the transparent substrate, and a method for manufacturing the same.

20 Claims, 3 Drawing Sheets

Bus bars disposed at both ends of the conductive heating emitting pattern; A power part connected to the bus bars.

At least one line connecting a central point of any one figure forming the Voronoi diagram to a central point of the adjacent figure forming a boundary with the figure has a different length from residual lines.

The Voronoi diagram is formed by a Voronoi diagram generator.

(51) Int. Cl.
*G02B 27/00* (2006.01)
*G02B 17/00* (2006.01)
*B29D 7/01* (2006.01)
*G02B 5/08* (2006.01)

(58) Field of Classification Search
CPC ............... G02B 27/00; G02B 27/0012; G02B 27/0025; G02B 5/08; G02B 17/00; H01C 17/02; B29D 7/01
USPC ........ 219/546, 547, 548; 359/613, 601–603; 264/1.34
See application file for complete search history.

(56) References Cited

U.S. PATENT DOCUMENTS

| | | | |
|---|---|---|---|
| 6,326,556 B1 | 12/2001 | Asai et al. | |
| 2005/0063066 A1* | 3/2005 | Namioka et al. | 359/613 |
| 2008/0130123 A1* | 6/2008 | Namioka et al. | 359/613 |
| 2009/0140938 A1 | 6/2009 | Ishibashi et al. | |

FOREIGN PATENT DOCUMENTS

| | | | | |
|---|---|---|---|---|
| FR | 2263657 | | 10/1975 | |
| GB | 2091528 | | 7/1982 | |
| JP | 04042835 A | * | 2/1992 | ............. C03C 17/06 |
| JP | 1992-087182 A | | 3/1992 | |
| JP | 07-242420 A | | 9/1995 | |
| JP | 1996-072674 A | | 3/1996 | |
| JP | 1997-008465 A | | 1/1997 | |
| JP | 11-214128 A | | 8/1999 | |
| JP | 2006-024500 A | | 1/2006 | |
| JP | 2008-077879 A | | 4/2008 | |
| JP | 2008077879 A | * | 4/2008 | |
| JP | 2008-523254 A | | 7/2008 | |
| KR | 20-0223604 | | 6/2001 | |
| KR | 10-2008-0004556 A | | 1/2008 | |
| WO | WO 2007-102490 A1 | | 9/2007 | |

OTHER PUBLICATIONS

Office Action of European Patent Office in Appl'n No. 10733650.5, dated Jun. 8, 2012.

* cited by examiner

[Figure 1]

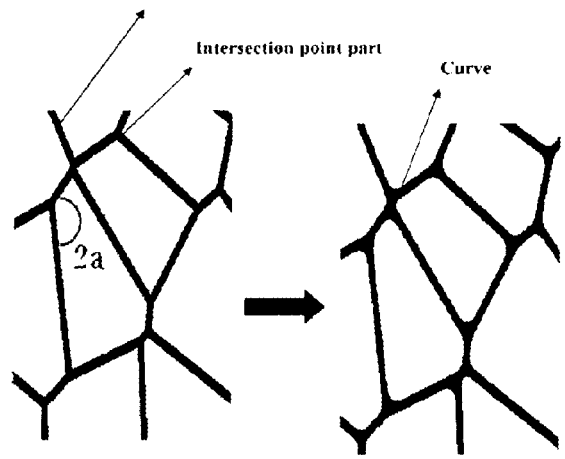

Bus bars disposed at both ends of the conductive heating emitting pattern; A power part connected to the bus bars.

At least one line connecting a central point of any one figure forming the Voronoi diagram to a central point of the adjacent figure forming a boundary with the figure has a different length from residual lines.

The Voronoi diagram is formed by a Voronoi diagram generator.

[Figure 2]

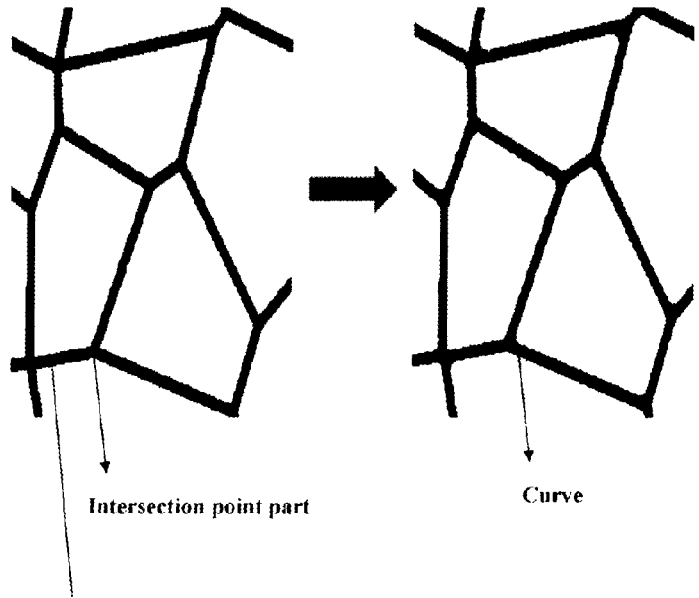

[Figure 3]
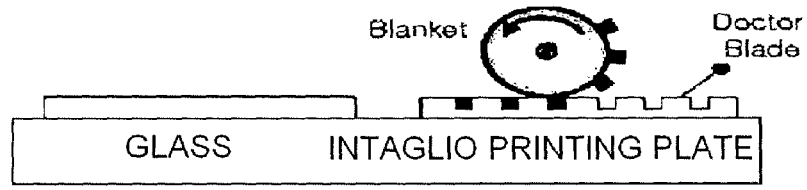
1. AFTER PASTE IS FILLED IN PATTERN OF INTAGLIO PRINTING PLATE BY USING DOCTOR BLADE, FRIST TRANSFER IS PERFORMED BY ROTATING BLANKET
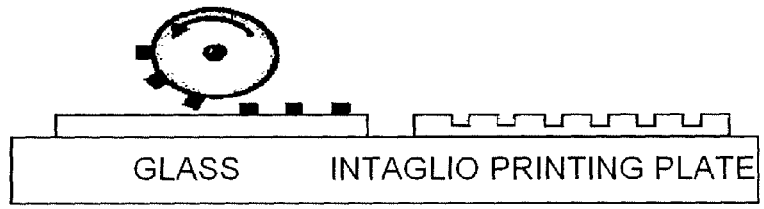
2. SECOND TRANSFER IS PERFORMED ON GLASS SURFACE BY ROTATING BLANKET
[Figure 4]
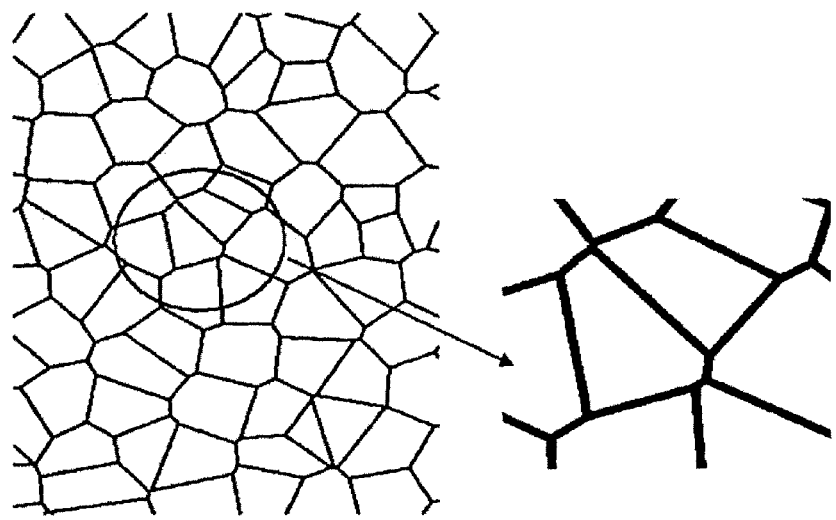
NO ROUNDING TREATMENT

[Figure 5]
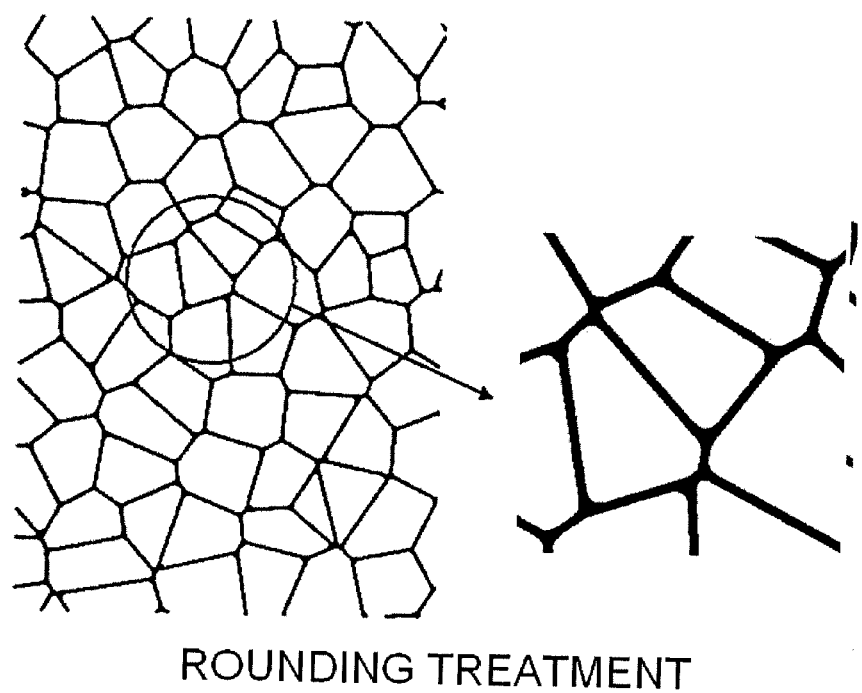
ROUNDING TREATMENT

HEATING ELEMENT AND A MANUFACTURING METHOD THEREOF This application is a national stage application of PCT/KR2010/000390, filed Jan. 21, 2010, which claims the priority to Korean Patent Application No. KR 10- 2009-0005222, filed Jan. 21, 2009, which is hereby incorporated by reference in its entirety.

TECHNICAL FIELD

The present invention relates to a heat emitting body and a method for manufacturing the same. More particularly, the present invention relates to a heat emitting body that includes a pattern that is not well visible, has excellent heat emitting performance at a low voltage, and is capable of minimizing diffraction and interference of light, and can minimize a reduction in a line width around an intersection point part when the pattern is printed, and a method for manufacturing the same.

BACKGROUND ART

In winter or a rainy day, frost is formed on a glass surface of a vehicle because of a difference between temperatures of the outside and inside of the vehicle. In addition, in the case of an indoor ski resort, a freezing phenomenon occurs because of a difference between temperatures of the inside where there is a slope and the outside of the slope. In order to solve this, a heat emitting glass has been developed. The heat emitting glass uses a concept where after a hot wire sheet is laminated to the glass surface or a hot wire is directly formed on the glass surface, a current is applied to both terminals of the hot wire to generate heat from the hot wire, thereby increasing the temperature of the glass surface. It is important that the heat emitting glass for a vehicle or construction has low resistance in order to smoothly generate heat, but it should not be displeasing to the eye. Accordingly, methods for manufacturing a known transparent heat emitting glass by forming a heat emitting layer through a sputtering process using a transparent conductive material such as ITO (Indium Tin Oxide) or an Ag thin film and connecting an electrode to a front end thereof have been proposed, but there is a problem in that it is difficult to drive the heat emitting glass at a low voltage of 40 V or less due to high surface resistance.

DISCLOSURE

Technical Problem

To solve the problems of the traditional arts, the present invention has been made in an effort to provide a heat emitting body that is not well visible, can minimize side effects by diffraction and interference in a single light source after sunset, has excellent heat emitting performance at a low voltage, and can minimize a reduction in a line width around an intersection point part when the pattern is printed, and a method for manufacturing the same.

Technical Solution

The present invention provides a heat emitting body, including: a) a transparent substrate, and b) a conductive heat emitting pattern having a boundary line shape of figures forming a Voronoi diagram and an intersection point part of boundary lines, at which two or more boundary lines meet each other, forming a curve on at least one side of the transparent substrate. The heat emitting body may further include c) bus bars disposed at both ends of the conductive heat emitting pattern, and d) a power part connected to the bus bar.

Also, the present invention provides a method for manufacturing the heat emitting body, the method including: forming a conductive heat emitting pattern having a boundary line shape of figures forming a Voronoi diagram and an intersection point part of boundary lines, at which two or more boundary lines meet each other, forming a curve on one side of a transparent substrate. The method may further include forming bus bars at both ends of the conductive heat emitting pattern, and providing a power part connected to the bus bar.

Yet, the present invention provides a heat emitting glass laminated body, including: a) a transparent substrate, and b) a conductive heat emitting pattern having a boundary line shape of figures forming a Voronoi diagram and an intersection point part of boundary lines, at which two or more boundary lines meet each other, forming a curve on at least one side of the transparent substrate, and c) a glass provided on the conductive heat emitting pattern. The heat emitting glass laminated body may further include d) bus bars disposed at both ends of the conductive heat emitting pattern between a) the transparent substrate and c) the glass, and e) a power part connected to d) the bus bar. An adhesive film may be provided between c) the glass and b) the conductive heat emitting pattern.

Still, the present invention provides a method for manufacturing the heat emitting glass laminated body, the method including: forming a conductive heat emitting pattern having a boundary line shape of figures forming a Voronoi diagram and an intersection point part of boundary lines, at which two or more boundary lines meet each other, forming a curve on one side of a transparent substrate; and laminating and attaching a glass to a surface of the transparent substrate on which a conductive heat emitting pattern is formed. The method may further include forming bus bars at both ends of the conductive heat emitting pattern before the glass is laminated after forming the conductive heat emitting pattern. In addition, the method may further include providing a power part connected to the bus bars after the glass is attached. When the glass is attached, an adhesive film may be disposed between the conductive heat emitting pattern and the glass.

In the heat emitting body or the heat emitting glass laminated body according to the present invention, the conductive heat emitting pattern may include 10% or more area of a pattern formed of figures having an asymmetric structure on the basis of a total area of the conductive heat emitting pattern.

In addition, the conductive heat emitting pattern may have a boundary line shape of figures forming the Voronoi diagram, and may include 10% or more area of a pattern in which at least one of lines connecting a central point of any one figure forming the Voronoi diagram to a central point of an adjacent figure forming a boundary with the figure has a different length from the residual lines on the basis of a total area of the conductive heat emitting pattern.

The area of the conductive heat emitting pattern having the boundary line shape of figures forming the Voronoi diagram may be 30% or more of the total area of the transparent substrate. A conductive heat emitting pattern having the other shape may be provided on at least a portion of the surface of the transparent substrate that does not have the conductive heat emitting pattern having the boundary line shape of the figures forming the Voronoi diagram.

The line forming the conductive heat emitting pattern having the boundary line shape of the figures forming the Voronoi diagram may be a straight line, and various modifications such as a curve, a wave line and a zigzag line may be possible.

In the heat emitting body or the heat emitting glass laminated body, the conductive heat emitting pattern may be formed by printing, a photolithography process, and a photography process.

Advantageous Effects

According to the exemplary embodiments of the present invention, a heat emitting body and a heat emitting glass laminated body include a conductive heat emitting pattern having a boundary line shape of figures forming the Voronoi diagram, and can minimize side effects by diffraction and interference of a single light source after sunset. In addition, in the case of the laminated body, since the conductive heat emitting pattern having the boundary line shape of the figures forming the Voronoi diagram may be formed by various methods such as printing, photolithography, and photography methods after a pattern shape is easily designed through a Voronoi generator, as described below, a process is easy and a cost is low.

In addition, since a curve shape is obtained by round treating an intersection an intersection point part of boundary lines, at which two or more boundary lines meet each other, of the conductive heat emitting pattern, it is possible to solve a problem of a reduction in a line width around the intersection point part or a short-circuit, and reduce surface resistance by increasing the line width of the intersection point part while not affecting the total permeability, such that a heat emitting characteristic may be improved.

DESCRIPTION OF DRAWINGS

FIGS. 1 and 2 are examples of formation of a conductive heat emitting pattern of a heat emitting glass by using a Voronoi diagram according to a first exemplary embodiment and a second exemplary embodiment of the present invention.

FIG. 3 is a view that illustrates an offset printing process.

FIG. 4 is an example of formation of the conductive heat emitting pattern of the heat emitting glass by using the Voronoi diagram in which an intersection point part is not round treated.

FIG. 5 is an example of formation of the conductive heat emitting pattern of the heat emitting glass by using the Voronoi diagram in which an intersection point part is round treated.

BEST MODE

Hereinafter, the present invention will be described in detail.

A heat emitting body and a heat emitting glass laminated body according to the present invention include a conductive heat emitting pattern having a boundary line shape of figures forming a Voronoi diagram and an intersection point part having a curve shape by round treating the intersection point part of boundary lines in order to minimize a reduction in a line width around the intersection point part of the boundary lines, at which two or more boundary lines meet each other when the pattern is printed.

In the present invention, side effects by diffraction and interference of light can be minimized by forming the conductive heat emitting line pattern in a boundary shape of figures that configure the Voronoi diagram. The Voronoi diagram is a pattern that is formed by filling the closest area to the corresponding dot as compared to the distance of each dot from the other dots if Voronoi diagram generator dots are disposed in a desired area to be filled. For example, when large discount stores in the whole country are represented by dots and consumers find the closest large discount store, the pattern that displays the commercial area of each discount store may be exemplified. That is, if the space is filled with regular hexagon and each dot of the regular hexagon is set by the Voronoi generator, the conductive heat emitting pattern may be a honeycomb structure.

In the present invention, the pattern derived from the generator is used by regularly or irregularly disposing the Voronoi diagram generator, and the pattern in which the intersection point part has a curve shape is used by round treating the intersection point part of the boundary lines.

When the conductive heat emitting pattern having the boundary line shape of areas forming the Voronoi diagram is printed, since a dug portion is formed, a line width of a wire after the printing may be reduced, but according to the present invention, it is possible to solve a problem of a reduction in a line width or a short-circuit according to formation of the dug portion around the intersection point part by round treating the intersection point part of the boundary lines between the patterns, and reduce surface resistance by increasing the line width of the intersection point part while not affecting the total permeability, such that a heat emitting characteristic may be improved.

As a method for forming the pattern in which the intersection point part is round treated, a method for changing a radius of an arc (refer to FIG. 1) or a method for fixing a radius of an arc (refer to FIG. 2) may be exemplified. In respects to the manufacturing of the pattern, as shown in FIGS. 1 and 2, the manufacturing may be implemented through a change of a computer program.

In detail, the intersection point is present between two lines. If there is a predetermined angle 2a between two lines, a central line that is disposed at the center between two lines may be drawn. When the radius of the arc is changed (refer to FIG. 1), a circle may be drawn by always constantly calculating the shortest distance from the intersection point along the central line to the other line. In this case, if the arc that is close to the intersection point is selected, this is a round treatment in respects to FIG. 1.

In the round treatment, the round treatment may be performed by fixing the radius. In this case, when an angle between two lines forming the intersection point is large, there is a problem in that the round treatment is excessively performed. Accordingly, the round treatment may be performed by drawing the intersection point and the central line of two lines forming the intersection point and forming a circle passing through the point of the central line that is disposed at a predetermined distance from the intersection point. That is, if the angle between two lines forming the intersection point is large, the radius of circle becomes small, and if the angle becomes small, the round treatment may be performed by increasing the radius.

In the case of FIG. 2, since the radius of the arc is constant, when the distance to the other line is identical with a predetermined radius while the point moves along the central line, the round treatment in respects to FIG. 2 is performed by drawing the circle around the point and selecting the arc that is close to the intersection point.

In respects to FIGS. 1 and 2, two intersection lines are described, but if a computer calculation is repeated, all intersection lines in respects to the intersection point may be calculated.

In addition, the round means a curve shape having a radius of curvature which is 0.1 to 5 times of a line width of the pattern. In the case of the curve shape having the radius of curvature within the above range, it is possible to prevent high surface resistance after the printed substance is sintered by the dug portion of the intersection point part during the printing and obtain the same permeability and reflectivity effects.

Meanwhile, a known conductive heat emitting pattern uses only a very regular pattern such as a grid manner or a linear manner. As described above, if only the regular pattern is used, diffraction and interference patterns of light may be displayed by a difference between refractive indexes of the conductive heat emitting pattern and the glass. The effect of patterns is maximized by the single light source that is present after sunset such as a headlight of the vehicle or a streetlamp. These phenomena may cause a problem in safety or the degree of fatigue of a driver. Meanwhile, in the case where the patterns are completely irregular, in the distribution of the line, there may be a difference between a loose portion and a dense portion thereof. The distribution of the line may be visible by the eye even though the line width is very thin.

In order to solve this problem of visual recognition, in the present invention, when the Voronoi diagram generator is formed, regularity and irregularity may be appropriately harmonized. For example, after the area having a predetermined size is set as the basic unit in the area in which the pattern is provided, the dots are generated so that the distribution of dots in the basic unit has the irregularity, thus manufacturing the Voronoi pattern. If the above method is used, the visibility can be compensated by preventing the localization of the distribution of lines on the one point.

As described above, for the uniform heat emission and visibility of the heat emitting body or the heat emitting glass laminated body, it is preferable that the opening ratio of the pattern is constant in the unit area. To this end, it is preferable that the number per unit area of the Voronoi diagram generator is controlled. In this case, when the number per unit area of the Voronoi diagram generator is uniformly controlled, the unit area is preferably 5 cm$^2$ or less and more preferably 1 cm$^2$ or less. The number per unit area of the Voronoi diagram generator is preferably 25 to 2,500/cm$^2$ and more preferably 100 to 2,000/cm$^2$.

Among the figures that form the pattern in the unit area, at least one has preferably the different shape from the remaining figures.

In addition, it is possible to maximize a minimization effect of side effects by diffraction and interference of light by forming the conductive heat emitting pattern that includes 10% or more area of a pattern formed of figures having an asymmetric structure on the basis of a total area of the pattern, or forming the conductive heat emitting pattern that has a boundary line shape of figures forming the Voronoi diagram and includes 10% or more area of a pattern in which at least one of lines connecting a central point of any one figure forming the Voronoi diagram to a central point of the adjacent figure forming a boundary with the figure has a different length from the residual lines on the basis of a total area of the conductive heat emitting pattern.

In the present invention, first, after a desired pattern shape is determined by using the Voronoi diagram generator, and a printing, a photolithography process, and a photography process are used, such that it is possible to form the conductive heat emitting pattern having the thin and precise line width on the transparent substrate. The Voronoi diagram generator means the dots that are disposed so that the Voronoi diagram can be formed as described above.

The printing method may be performed by using a method in which the paste that includes the conductive heat emitting material is transferred on the transparent substrate in the desired pattern form and sintered. The transferring method is not particularly limited, but the above pattern form is formed on the pattern transferring medium such as an intaglio printing plate or a screen and the desired pattern may be transferred on the transparent substrate by using this. The method for forming the pattern form on the pattern transferring medium may be performed by using the method that is known in the art.

The printing method is not particularly limited, and a printing method such as offset printing, screen printing, and gravure printing may be used. The offset printing may be performed by using the method in which after the paste is filled in the intaglio printing plate on which the pattern is formed, first transferring is performed by using silicon rubber that is called as the blanket, and the second transferring is performed by closely contacting the blanket and the transparent substrate. The screen printing may be performed by using the method in which after the paste is disposed on the screen on which the pattern is formed, the paste is directly provided on the substrate through the screen that has the space while the squeeze is pushed. The gravure printing may be performed by using the method in which after the paste is filled in the pattern while the blanket where the pattern is formed on the roll is wound, it is transferred on the transparent substrate. In the present invention, the above method may be used and the above methods may be used in combination. In addition, the other printing method that is known to those who are skilled in the art may be used.

In the case of the offset printing method, because of the release property of the blanket, since most of the paste is transferred on the transparent substrate such as glass, a separate blanket washing process is not required. The intaglio printing plate may be manufactured by precisely etching the glass on which the desired conductive heat emitting pattern is formed, and metal or DLC (diamond-like carbon) coating may be performed on the glass surface for the durability. The intaglio printing plate may be manufactured by etching the metal plate.

In the present invention, in order to implement the more precise conductive heat emitting pattern, it is preferable to use the offset printing method. FIG. 3 illustrates the offset printing method. According to FIG. 3, after the paste is filled in the pattern of the intaglio printing plate by using the doctor blade as the first step, the first transferring is performed by rotating the blanket, and as the second step, the second transferring is performed on the glass surface by rotating the blanket.

If the pattern is printed by using this printing method, since a dug portion is formed when a groove part is coated by a doctor blade around the intersection point part of the boundary lines between the patterns, the line width of the wire may be reduced after the printing. In particular, the reduction phenomenon of the line width may become serious as the boundary line and the doctor blade are parallel to each other. However, according to the present invention, it is possible to solve a problem of a reduction in a line width or a short-circuit according to formation of the dug portion around the intersection point part by round treating the intersection point part of the boundary lines between the patterns, and reduce surface resistance by increasing the line width of the intersection point part while not affecting the total permeability, such that a heat emitting characteristic may be improved.

In the present invention, it is not limited to the above printing method, and the photolithography process may be used. For example, the photolithography process may be performed by using the method in which the conductive heat emitting pattern material layer is formed on the entire surface of the transparent substrate, the photoresist layer is formed thereon, the photoresist layer is patterned by the selective exposure and developing process, the conductive heat emitting pattern material layer is patterned by using the patterned photoresist layer as the mask, and the photoresist layer is removed.

The present invention may also use the photography method. For example, after the picture photosensitive material that includes silver halide is coated on the transparent substrate, the pattern may be formed by selectively exposing and developing the photosensitive material. A plating treatment may be further performed in order to increase conductivity of the heat emitting pattern. The plating may use an electroless plating method, copper or nickel may be used as the plating material, and after the copper plating is performed, nickel plating may be performed thereon, but the scope of the present invention is not limited thereto.

In the present invention, the transparent substrate is not particularly limited, but it is preferable to use the board where the light permeability is 50% or more, and preferably 75% or more. In detail, glass may be used as the transparent substrate, and the plastic film may be used. In the case where the plastic film is used, it is preferable that after the conductive heat emitting pattern is formed, glass is laminated on at least one side of the substrate. In this case, it is more preferable that the glass is laminated to the side of the transparent substrate on which the conductive heat emitting pattern is formed. A material that is known in the art may be used as the plastic film, for example, it is preferable to use the film that has the visible ray permeability of 80% or more such as PET (Polyethylene terephthalate), PVB (polyvinylbutyral), PEN (polyethylene naphthalate), PES (polyethersulfon), and PC (polycarbonate), and it is preferable that the thickness thereof is 50 to 450 micrometers.

In the present invention, it is preferable that as the conductive heat emitting material, metal that has an excellent thermal conductivity is used. In addition, the specific resistance value of the conductive heat emitting material is preferably in the range of 1 microOhm cm to 200 microOhm cm. As a detailed example of the conductive heat emitting material, copper, silver, etc. may be used, and silver is the most preferable. The conductive heat emitting material may be used in a particle form. In the exemplary embodiment of the present invention, as the conductive heat emitting material, copper particles that are coated with silver may be also used.

In the present invention, in the case where the paste that includes the conductive heat emitting material is used, the paste may further include an organic binder in addition to the aforementioned conductive heat emitting material so as to easily perform the printing process. It is preferable that the organic binder has a volatile property in the sintering process. As the organic binder, there are polyacryl-based resin, polyurethane-based resin, polyester-based resin, polyolefin-based resin, polycarbonate-based resin and cellulose resin, polyimide-based resin, polyethylene naphthalate-based resin, denatured epoxy, etc. but it is not limited thereto.

In order to improve the attachment ability of the paste to the glass, the paste may further include a glass frit. The glass frit may be selected from the commercial products, but it is preferable to use the environmentally friendly glass frit without lead component. In this case, it is preferable that the average diameter of the glass frit is 2 micrometers or less and the maximum diameter thereof is 50 micrometers or less.

If necessary, a solvent may be further added to the paste. As the solvent, there are butyl carbitol acetate, carbitol acetate, cyclohexanon, cellosolve acetate, terpineol, etc., but it is not limited thereto.

In the present invention, in the case where the paste that includes the conductive heat emitting material, organic binder, glass frit and solvent is used, it is preferable that the weight ratio of the conductive heat emitting material is 50 to 90%, the weight ratio of the organic binder is 1 to 20%, the weight ratio of the glass frit is 0.1 to 10%, and the weight ratio of the solvent is 1 to 20%.

It may be formed so that the line width of the line forming the conductive heat emitting pattern is 100 micrometers or less, preferably 30 micrometers or less, more preferably 25 micrometers or less.

In the present invention, in the case where the above paste is used, if the paste is sintered after the paste is printed in a boundary shape of figures forming the Voronoi diagram, the heat emitting pattern that has the conductivity is formed. In this case, the sintering temperature is not particularly limited, but it may be 500 to 800° C. and preferably 600 to 700° C. In the case where the board that forms the heat emitting pattern is glass, if necessary, in the above sintering step, the glass may be shaped for the purpose of construction or vehicles. For example, in the step for shaping the glass for vehicles in a curved line, the paste may be sintered. In addition, in the case where the plastic film is used as the substrate that forms the conductive heat emitting pattern, it is preferable that the sintering is performed at a relatively low temperature. For example, it may be performed at 50 to 350° C.

In the method for manufacturing the heat emitting body according to the present invention, the step for forming the bus bar at both ends of the conductive heat emitting pattern and the step for providing the power part that is connected to the bus bar may be further performed. These steps may use a method that is known in the art. For example, the bus bar may be simultaneously formed in conjunction with the formation of the conductive heat emitting pattern, and may be also formed by using the other printing method after the conductive heat emitting pattern is formed. For example, after the conductive heat emitting pattern is formed by using the offset printing method, the bus bar may be formed through the screen printing. In this case, the thickness of the bus bar is appropriately 1 to 100 micrometers and it is preferably 10 to 50 micrometers. If it is less than 1 micrometer, since the contact resistance between the conductive heat emitting pattern and the bus bar is increased, local heat emission may be performed at the contact portion, and if it is more than 100 micrometers, the cost of the electrode material is increased. The connection between the bus bar and the power may be performed through soldering and physical contact to the structure that has good conductive heat emission.

In order to conceal the conductive heat emitting pattern and the bus bar, the black pattern may be formed. The black pattern may be printed by using the paste that includes cobalt oxides. In this case, it is appropriate that the printing method is the screen printing, and its thickness is 10 to 100 micrometers. The conductive heat emitting pattern and the bus bar may be also formed before or after the black pattern is formed.

The method for manufacturing the heat emitting glass laminated body according to the present invention, like the above method for manufacturing the heat emitting body, includes forming a conductive heat emitting pattern, and sequentially laminating and attaching a glass to a surface of the transparent substrate on which the conductive heat emitting pattern is formed. In this case, the attachment method may use a method that is known in the art. In this case, the transparent substrate that is provided with the conductive heat emitting pattern and the glass may be attached to each other by using an adhesive film. This method may further include forming a bus bar and providing a power part connected to the bus bar.

For example, the attachment method may be performed by a process for inserting and attaching an adhesive film between the transparent substrate on which the conductive heat emitting pattern is formed and the glass. In this case, in the present invention, the aforementioned conductive heat emitting pattern is printed on at least one side of the transparent substrate. In the attaching process, the temperature and pressure may be controlled.

In one detailed embodiment, the adhesive film is inserted between the transparent substrate on which the conductive heat emitting pattern is formed and the glass, and they are put into the vacuum bag, and reduced in pressure or increased in temperature or increased in temperature by using the hot roll, thus removing the air, thereby accomplishing first attachment. In this case, the pressure, temperature and time may vary according to the kind of the adhesive film, but in general, the temperature may be gradually increased from normal temperature to 100° C. at a pressure of 300 to 700 Torr. In this case, it is preferable that the time is generally 1 hour or less. The preliminarily laminated layered structure that is first laminated is subjected to the second attachment process by the autoclave process where the temperature is increased while the pressure is added in the autoclave. The second attachment varies according to the kind of the adhesive film, but it is preferable that after the attachment is performed at the pressure of 140 bar or more and the temperature in the range of 130 to 150° C. for 1 to 3 hours, and preferably about 2 hours, it is slowly cooled.

In the other detailed embodiment, the method for attaching them through one step by using the vacuum laminator device unlike the above two-step attachment process may be used. The attachment may be performed by stepwisely increasing the temperature to 80 to 150° C. and slow cooling them so that the pressure is reduced (~5 mbar) until the temperature is 100° C. and thereafter the pressure is added (~1000 mbar).

Here, any material that has an adhesive strength and is transparent after attaching may be used as the material of the adhesive film. For example, the PVB film, EVA film, PU film and the like may be used, but is not limited thereto. The adhesive film is not particularly limited, but it is preferable that its thickness is in the range of 100 micrometers to 800 micrometers.

In the above method, the laminated glass may be formed of only the glass and may be formed of the glass that is provided with the conductive heat emitting pattern that is manufactured as described above.

It is preferable that the line width of the conductive heat emitting pattern of the heat emitting body or the heat emitting glass laminated body is 100 micrometers or less, preferably 30 micrometers or less, more preferably 25 micrometers or less and 5 micrometers or more. An interval between the lines of the conductive heat emitting pattern is preferably 50 micrometers to 30 mm and preferably 200 micrometers to 1 mm. The height of the line is 1 to 100 micrometers, and more preferably 3 micrometers.

The heat emitting body or the heat emitting glass laminated body according to the present invention may be connected to the power for heat emission, and in this case, the heat emitting amount is 100 to 500 W per $m^2$, and preferably 200 to 300 W. Since the heat emitting body or the heat emitting glass laminated body according to the present invention has excellent heat emitting performance even at the low voltage, for example, 30 V or less, and preferably 20V or less, it may be usefully used in vehicles and the like. The resistance of the heat emitting body or the heat emitting glass laminated body is 5Ω/□ or less, preferably 1Ω/□ or less, and more preferably 0.5Ω/□ or less.

The heat emitting body or the heat emitting glass laminated body according to the present invention may have a curved surface shape.

In the heat emitting body or the heat emitting glass laminated body according to the present invention, it is preferable that the opening ratio of the conductive heat emitting pattern, that is, the area ratio of the glass that is not covered with the pattern is 70% or more. The heat emitting body or the heat emitting glass laminated body according to the present invention has an excellent heat emitting property where an opening ratio is 70% or more, the temperature deviation within 5 min after heat emission operation is maintained at 10% or less, and the temperature is increased.

The heat emitting body or the heat emitting glass laminated body according to the present invention may be applied to glass that is used for various transport means such as vehicles, ships, and airplanes, houses or other buildings.

[Mode for Invention]

Hereinafter, the present invention will be described in more detail through Example and Comparative Example.

COMPARATIVE EXAMPLE

After the rectangle of 0.09 $mm^2$ was set as the basic unit, the Voronoi pattern was manufactured by providing irregularity to the distribution of points in the basic unit. The degree of irregularity was obtained by selecting any one point in 100% area on the basis of the central point of the basic unit area, and the Voronoi pattern was manufactured by using the selected points having the density of 1111/$cm^2$. The pattern manufactured by using the above method was shown in FIG. 4.

EXAMPLE

The pattern that was round treated by forming the central line between two lines connecting the intersection point parts of the Voronoi pattern of Comparative Example and forming a circle passing through the point that was apart 18 micrometers from the intersection point was manufactured. The pattern manufactured by using the above method was shown in FIG. 5.

EXPERIMENTAL EXAMPLE

After the silver pattern was formed by using the offset printer using the method shown in FIG. 3 on the glass substrate (370 mm×470 mm) on the basis of the patterns manufactured by Example and Comparative Example, the silver line was formed by sintering the pattern at 580□ for 10 min in the belt furnace. In this case, the width of the formed silver line was 25 micrometers, and the height was 2.5 micrometers.

In this case, the used silver paste was a high temperature sintering type of silver paste that was suitable for offset printing of the circuit substrate, and after mixing 80 wt % of the silver (Ag) particles (average particle diameter=about 2 micrometers), 18 wt % of the binder manufactured by mixing the polyester resin and BCA at a ratio of 1:1, and 2 wt % of glass frit for attachment ability to the glass with each other, it was kneaded for 30 min by using the three-stage roll-mill. In this case, the viscosity was about 10,000 cps (spindle number 5, 1 rpm).

In addition, for the comparison of Example and Comparative Example, the permeability and the surface resistance were measured, the conductivity and permeability of the patterns after the printing and the sintering were measured, and they are described in Table 1.

[Evaluation of Physical Properties]
1) Surface resistance; It was measured by using Loresta-GP MCP-T600 manufactured by Mitsubish Chemical Corporation.
2) Permeability@550 nm; It was measured by using Shimadzu UV-3600 uv-Vis-NIR spectrophotometer.
3) Reflectivity@550 nm; It was measured by using Shimadzu UV-3600 uv-Vis-NIR spectrophotometer.

TABLE 1

| | Example | Comparative Example |
|---|---|---|
| Surface resistance($\Omega$/□) | 0.33 | 0.43 |
| Permeability (%) | 76.2 | 76.4 |
| Reflectivity (%) | 8.5 | 8.6 |

Through Table 1, there was no change in the permeability and reflectivity before the intersection point part according to Comparative Example was round treated (FIG. 4) and after the intersection point part according to Example was round treated (FIG. 5), but it can be seen that the surface resistance has an improvement effect from 0.43 $\Omega$/□ to 0.33 $\Omega$/□ by about 25%.

In order to measure the diffraction and interference effects of the patterns before the intersection point part according to Comparative Example was round treated (FIG. 4) and after the intersection point part according to Example was round treated (FIG. 5), the distance between the observer and the light source was 7 m or more, and the printed heat emitting glass was disposed between the observer and the light source. In both cases, not the strong interference pattern around the light source but weak scattering was observed.

The invention claimed is:

1. A heat emitting body, comprising:
a) a transparent substrate,
b) an electrically conductive heat emitting line pattern on at least one side of the transparent substrate, the electrically conductive heat emitting line pattern defining boundary lines of a Voronoi diagram, and defining intersection points where two or more boundary lines intersect at an angle, each intersection point having a curved shape, wherein the curved shape is an arc closest to the intersection point, the arc being defined by adjusting a diameter that passes through a point on a line central to the intersection point and disposed at a predetermined distance from the intersection point based on the angle formed between the boundary lines that form the intersection point,
c) bus bars disposed at both ends of the electrically conductive heat emitting line pattern, and
d) a power part connected to the bus bars,
wherein the curved shape at the intersection point has a radius of curvature which is 0.1 to 5 times of a line width of the boundary lines defined by the electrically conductive heat emitting line pattern, and the line width of the electrically conductive heat emitting line pattern is 30 micrometers or less,
wherein 10% or more of the Voronoi diagram defined by the electrically conductive heat emitting line pattern comprises an area in which at least a line connecting a central point of one shape in the Voronoi diagram to a central point of an adjacent shape in the Voronoi diagram has a different length than any other line, and
wherein the Voronoi diagram is formed by Voronoi diagram generators and controlled so that a distribution of the Voronoi diagram generators per a unit area of 5 $cm^2$ or less is uniform, and the Voronoi diagram generators have a distribution of 25 to 2,500/$cm^2$ in a unit area of 5 $cm^2$ or less.

2. The heat emitting body according to claim 1, wherein 10% or more of the Voronoi diagram defined by the electrically conductive heat emitting line pattern comprises asymmetric shapes.

3. The heat emitting body according to claim 1, wherein at least a portion of the electrically conductive heat emitting line pattern comprises at least one of a straight line, a curve, a wave line and a zigzag line.

4. The heat emitting body according to claim 1, further comprising an opening ratio that is 70% or more, wherein the opening ratio is a ratio of an area of the transparent substrate that is not covered with the electrically conductive heat emitting line pattern to an area of the transparent substrate that is covered by the electrically conductive heat emitting line pattern.

5. The heat emitting body according to claim 1, wherein the heat emitting body has an opening ratio that is 70% or more, wherein the opening ratio is a ratio of an area of the transparent substrate that is not covered with the electrically conductive heat emitting line pattern to an area of the transparent substrate that is covered by the electrically conductive heat emitting line pattern; and
wherein the heat emitting body can exhibit a temperature deviation of 10% or less after 5 minutes of increased heat emission operation.

6. The heat emitting body according to claim 5, wherein the electrically conductive heat emitting line pattern further comprises an organic binder and glass frit.

7. The heat emitting body according to claim 1, wherein the electrically conductive heat emitting line pattern comprises copper or silver.

8. A method for manufacturing a heat emitting body, the method comprising:
forming an electrically conductive heat emitting line pattern on one side of a transparent substrate, the electrically conductive heat emitting line pattern defining boundary lines of a Voronoi diagram, and defining intersection points where two or more boundary lines intersect at an angle, each intersection point having a curved shape formed by a round treatment, wherein the curved shape is an arc closest to the intersection point, the arc being defined by adjusting a diameter that passes through a point on a line central to the intersection point and disposed at a predetermined distance from the intersection point based on the angle formed between the boundary lines that form the intersection point, forming bus bars at both ends of the electrically conductive heat emitting line pattern, and providing a power part connected to the bus bars, wherein the curved shape at the intersection point has a radius of curvature which is 0.1 to 5 times of a line width of the boundary lines defined by the electrically conductive heat emitting pattern, and the line width of the electrically conductive heat emitting line pattern is 30 micrometers or less, wherein 10% or more of the Voronoi diagram defined by the electrically conductive heat emitting line pattern comprises an area in which at least a line connecting a central point of one shape in the Voronoi diagram to a central point of an adjacent shape in the Voronoi diagram has a different length than any other line, and wherein the Voronoi diagram is formed by Voronoi diagram generators and controlled so that a distribution of the Voronoi diagram generators per a unit area of 5 cm$^2$ or less is uniform, and the Voronoi diagram generators have a distribution of 25 to 2,500/cm$^2$ in a unit area of 5 cm$^2$ or less.

9. The method for manufacturing the heat emitting body according to claim 8, wherein the forming of the electrically conductive heat emitting line pattern includes transferring a paste including an electrically conductive heat emitting material on the transparent substrate in a shape of boundary lines defining the Voronoi diagram, and sintering the electrically conductive heat emitting material.

10. The method for manufacturing the heat emitting body according to claim 8, wherein after the electrically conductive heat emitting line pattern is formed, a plating treatment is further performed.

11. A heat emitting glass laminated body, comprising:
a) a transparent substrate, and
b) an electrically conductive heating emitting line pattern on at least one side of the transparent substrate, the electrically conductive heating emitting line pattern defining boundary lines of a Voronoi diagram, and defining intersection points where two or more boundary lines intersect at an angle, each intersection point having a curved shape, wherein the curved shape is an arc closest to the intersection point, the arc being defined by adjusting a diameter that passes through a point on a line central to the intersection point and disposed at a predetermined distance from the intersection point based on the angle formed between the two lines that form the intersection point,
c) a glass provided on the electrically conductive heat emitting line pattern,
d) bus bars disposed at both ends of the electrically conductive heat emitting line pattern between the transparent substrate and the glass, and
e) a power part connected to the bus bars, wherein the curved shape at the intersection point has a radius of curvature which is 0.1 to 5 times of a line width of the boundary lines defined by the electrically conductive heat emitting line pattern, and the line width of the electrically conductive heat emitting line pattern is 30 micrometers or less, wherein 10% or more of the Voronoi diagram defined by the electrically conductive heat emitting line pattern comprises an area in which at least a line connecting a central point of one shape in the Voronoi diagram to a central point of an adjacent shape in the Voronoi diagram has a different length than any other line, and wherein the Voronoi diagram is formed by Voronoi diagram generators and controlled so that a distribution of the Voronoi diagram generators per a unit area of 5 cm$^2$ or less is uniform, and the Voronoi diagram generators have a distribution of 25 to 2,500/cm$^2$ in a unit area of 5 cm$^2$ or less.

12. The heat emitting glass laminated body according to claim 11, wherein an adhesive film is provided between the glass and the electrically conductive heat emitting line pattern.

13. The heat emitting glass laminated body according to claim 11, wherein an opening ratio is 70% or more, and the opening ratio is an area ratio of the transparent substrate that is not covered with the electrically conductive heat emitting line pattern.

14. The heat emitting glass laminated body according to claim 13, wherein a temperature deviation within 5 minutes after a heat emission operation is 10% or less.

15. The heat emitting glass laminated body according to claim 11, wherein the electrically conductive heat emitting line pattern includes copper or silver.

16. The heat emitting glass laminated body according to claim 11, wherein the electrically conductive heat emitting line pattern further includes an organic binder and glass frit.

17. A method for manufacturing a heat emitting glass laminated body, the method comprising:
forming an electrically conductive heat emitting line pattern on at least one side of a transparent substrate, the electrically conductive heat emitting line pattern defining boundary lines of a Voronoi diagram, and defining intersection points where two or more boundary lines intersect at an angle, each intersection point having a curved shape formed by a round treatment, wherein the curved shape is an arc closest to the intersection point, the arc being defined by adjusting a diameter that passes through a point on a line central to the intersection point and disposed at a predetermined distance from the intersection point based on the angle formed between the boundary lines that form the intersection point,
laminating and attaching a glass to a surface of the transparent substrate on which the electrically conductive heat emitting line pattern is formed,
forming bus bars at both ends of the electrically conductive heat emitting line pattern before the glass is laminated, and
providing a power part connected to the bus bars after the glass is laminated and attached, wherein the curved shape at the intersection point has a radius of curvature which is 0.1 to 5 times of a line width of the boundary lines defined by the electrically conductive heat emitting line pattern, and the line width of the electrically conductive heat emitting line pattern is 30 micrometers or less wherein 10% or more of the Voronoi diagram defined by the electrically conductive heat emitting line pattern comprises an area in which at least a line connecting a central point of one shape in the Voronoi diagram to a central point of an adjacent shape in the Voronoi diagram has a different length than any other line, and wherein the Voronoi diagram is formed by Voronoi diagram generators and controlled so that a distribution of the Voronoi diagram generators per a unit area of 5 cm$^2$ or less is uniform, and the Voronoi diagram generators have a distribution of 25 to 2,500/cm$^2$ in a unit area of 5 cm$^2$ or less.

18. The method for manufacturing the heat emitting glass laminated body according to claim 17, wherein when the glass is laminated and attached, an adhesive film is used.

19. The method for manufacturing the heat emitting glass laminated body according to claim 17, wherein the forming of the electrically conductive heat emitting line pattern includes transferring a paste including an electrically conductive heat emitting material on the transparent substrate in a shape of boundary lines defining the Voronoi diagram, and sintering the electrically conductive heat emitting material.

20. The method for manufacturing the heat emitting glass laminated body according to claim 17, wherein after the electrically conductive heat emitting line pattern is formed, a plating treatment is further performed.

\* \* \* \* \*